United States Patent
Yumii

(10) Patent No.: US 11,453,252 B2
(45) Date of Patent: Sep. 27, 2022

(54) PNEUMATIC TIRE

(71) Applicant: BRIDGESTONE CORPORATION, Tokyo (JP)

(72) Inventor: Keita Yumii, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 5 days.

(21) Appl. No.: 16/771,218

(22) PCT Filed: Dec. 13, 2018

(86) PCT No.: PCT/JP2018/045972
§ 371 (c)(1),
(2) Date: Jun. 10, 2020

(87) PCT Pub. No.: WO2019/124228
PCT Pub. Date: Jun. 27, 2019

(65) Prior Publication Data
US 2021/0146734 A1 May 20, 2021

(30) Foreign Application Priority Data

Dec. 18, 2017 (JP) .............................. JP2017-242171

(51) Int. Cl.
*B60C 5/14* (2006.01)
*B60C 17/06* (2006.01)
*B60C 17/00* (2006.01)

(52) U.S. Cl.
CPC .......... *B60C 17/0009* (2013.01); *B60C 5/142* (2013.01); *B60C 2017/0072* (2013.01)

(58) Field of Classification Search
CPC . B60C 17/00; B60C 17/0009; B60C 17/0018; B60C 17/0027; B60C 17/0036;
(Continued)

(56) References Cited

U.S. PATENT DOCUMENTS 3,786,851 A * 1/1974 Mirtain ................. B60C 9/2006
152/531
6,988,522 B2 * 1/2006 Colantonio ........... B60C 1/0008
152/510
(Continued)

FOREIGN PATENT DOCUMENTS

CN 103625221 A 3/2014
CN 106794719 A 5/2017
(Continued)

OTHER PUBLICATIONS

Jun. 23, 2020, International Preliminary Report on Patentability issued in the International Patent Application No. PCT/JP2018/045972.
(Continued)

*Primary Examiner* — Justin R Fischer
(74) *Attorney, Agent, or Firm* — Kenja IP Law PC

(57) ABSTRACT

The pneumatic tire includes: a pair of bead portions; a pair of sidewall portions; a tread portion; a carcass; a reinforcing rubber layer, a tire widthwise cross-section of the reinforcing rubber layer having a substantially crescent shape; an inclined belt including at least one inclined belt layer formed by a plurality of cords extending at an inclination to a tire circumferential direction and covered with rubber; and an inner liner provided on an inner peripheral surface of a tire body in at least the tread portion. In a tire widthwise cross-sectional view, an edge of the inner liner is positioned farther outward in the tire radial direction than a tire maximum width position of the pneumatic tire and farther inward in the tire radial direction than a perpendicular from a tire widthwise edge of the inclined belt to the inner peripheral surface of the tire body.

12 Claims, 2 Drawing Sheets

(58) Field of Classification Search
CPC ........ B60C 17/0045; B60C 2017/0054; B60C 2017/0063; B60C 2017/0072; B60C 2017/0081; B60C 5/14; B60C 5/142; B60C 2005/145; B60C 2005/147
See application file for complete search history.

(56) References Cited

U.S. PATENT DOCUMENTS

| | | |
|---|---|---|
| 9,669,666 B2 | 6/2017 | Yukawa |
| 10,099,517 B2 | 10/2018 | Watanabe |
| 2004/0112496 A1 | 6/2004 | Domenico Colantonio et al. |
| 2006/0016539 A1 | 1/2006 | Colantonio et al. |
| 2014/0034205 A1 | 2/2014 | Naoki |
| 2014/0048193 A1 | 2/2014 | Yukawa |
| 2017/0297383 A1 | 10/2017 | Hatanaka et al. |

FOREIGN PATENT DOCUMENTS

| | | | |
|---|---|---|---|
| DE | 102007012401 A1 | | 9/2008 |
| EP | 1428691 A1 | | 6/2004 |
| EP | 2695752 A1 | | 2/2014 |
| EP | 2700513 A1 | | 2/2014 |
| EP | 3659823 A1 | | 6/2020 |
| FR | 2996807 | * | 4/2014 |
| JP | 10-244817 | * | 9/1998 |
| JP | H11348515 A | | 12/1999 |
| JP | 2008174037 A | | 7/2008 |
| JP | 2009090742 A | | 4/2009 |
| JP | 2010143237 A | | 7/2010 |
| JP | 2010269735 A | | 12/2010 |
| JP | 2014031147 A | | 2/2014 |
| JP | 2014037214 A | | 2/2014 |
| JP | 2015033958 A | | 2/2015 |
| JP | 2015120483 A | | 7/2015 |
| WO | WO 02/30691 | * | 4/2002 |

OTHER PUBLICATIONS

Mar. 12, 2019, International Search Report issued in the International Patent Application No. PCT/JP2018/045972.
Jul. 14, 2021, search result of the Extended European Search Report issued by the European Patent Office in the corresponding European Patent Application No. 18891891.6.
Sep. 13, 2021, search result of Office Action issued by the China National Intellectual Property Administration in the corresponding Chinese Patent Application No. 201880078498.X.

* cited by examiner

PNEUMATIC TIRE

TECHNICAL FIELD

The present disclosure relates to a pneumatic tire.

BACKGROUND

A run flat tire is a tire that can run safely for a certain distance without losing its load-carrying capacity even when the tire internal pressure reduces due to a flat or like. A side-reinforced run flat tire provided with a reinforcing rubber layer, a cross-section of which has a crescent shape, in the sidewall portion of the tire is known (for example, see patent literature (PTL) 1).

In general, an inner liner made of a rubber member that is highly impermeable to air is disposed on the inner peripheral surface of the tire body (the tire portion excluding the inner liner). The rubber material used for the inner liner has extremely low air permeability but a large value for tan δ, which is an index of heat buildup.

Hence, another approach to the aforementioned side-reinforced run flat tire is to achieve impermeability to air by the reinforcing rubber layer or the like provided in the sidewall portion and to omit the inner liner in the region where the impermeability to air is guaranteed (for example, see PTL 2).

CITATION LIST

Patent Literature

PTL 1: JP2015-033958A
PTL 2: JP2014-037214A

SUMMARY

Technical Problem

I discovered, however, that when the inner liner is provided partially on the inner peripheral surface of the tire body, tire durability may degrade depending on the position at which the inner liner is provided.

Therefore, the present disclosure aims to provide a pneumatic tire that can suppress a decrease in tire durability while improving the rolling resistance performance of the tire by partial provision of an inner liner.

Solution to Problem

A pneumatic tire of the present disclosure comprises: a pair of bead portions; a pair of sidewall portions extending outward in a tire radial direction of the bead portions; a tread portion extending between the sidewall portions; a carcass extending toroidally between the bead portions; a reinforcing rubber layer provided in the sidewall portions, a tire widthwise cross-section of the reinforcing rubber layer having a substantially crescent shape; an inclined belt, provided in the tread portion, including at least one inclined belt layer formed by a plurality of cords extending at an inclination to a tire circumferential direction and covered with rubber; and an inner liner provided on an inner peripheral surface of a tire body in at least the tread portion; wherein in a tire widthwise cross-sectional view, an edge of the inner liner is positioned farther outward in the tire radial direction than a tire maximum width position of the pneumatic tire and farther inward in the tire radial direction than a perpendicular from a tire widthwise edge of the inclined belt to the inner peripheral surface of the tire body.

In the present disclosure, the positional relationship of the inner liner and the like refers to the positional relationship when the tire is mounted on a rim, filled to a predetermined internal pressure, and in a state with no load.

The aforementioned "rim" refers to an approved rim of an applicable size, such as the Measuring Rim in the STANDARDS MANUAL of the European Tire and Rim Technological Organization (ETRTO) in Europe or the Design Rim in the YEAR BOOK of the Tire and Rim Association, Inc. (TRA) in the USA, that is or will be described in the future in industrial standards effective in a region where the tire is manufactured and used, such as the JATMA YEAR BOOK published by the Japan Automobile Tyre Manufacturers Association (JATMA) in Japan, the STANDARDS MANUAL of the ETRTO, and the YEAR BOOK of the TRA. (In other words, the aforementioned "rim" encompasses sizes that may be included in the future in the aforementioned industrial standards as well as current sizes. Examples of "sizes that will be described in the future" are the sizes described as "FUTURE DEVELOPMENTS" in the 2013 edition of the ETRTO STANDARDS MANUAL.) In the case of a size not described in the aforementioned industrial standards, the aforementioned "rim" refers to a rim of a width corresponding to the bead width of the tire. The "predetermined internal pressure" refers to the air pressure (maximum air pressure) corresponding to the maximum load capability of a single wheel of the applicable size/ply rating described in the JATMA YEAR BOOK or the like. In the case of a size not described in the aforementioned industrial standards, the "predetermined internal pressure" refers to the air pressure (maximum air pressure) corresponding to the maximum load capability prescribed for each vehicle on which the tire is mounted. Furthermore, air mentioned herein can be substituted with an inactive gas such as nitrogen gas and the like.

The "tread ground contact edges" in the present disclosure refer to the tire widthwise edges on the entire outer peripheral surface of the tire that contacts the road surface when the tire is mounted on a rim, filled to a predetermined internal pressure, and rolled with the maximum load applied.

Advantageous Effect

The present disclosure can provide a pneumatic tire that can suppress a reduction in tire durability while improving the rolling resistance performance of the tire.

DETAILED DESCRIPTION

Figure 1:
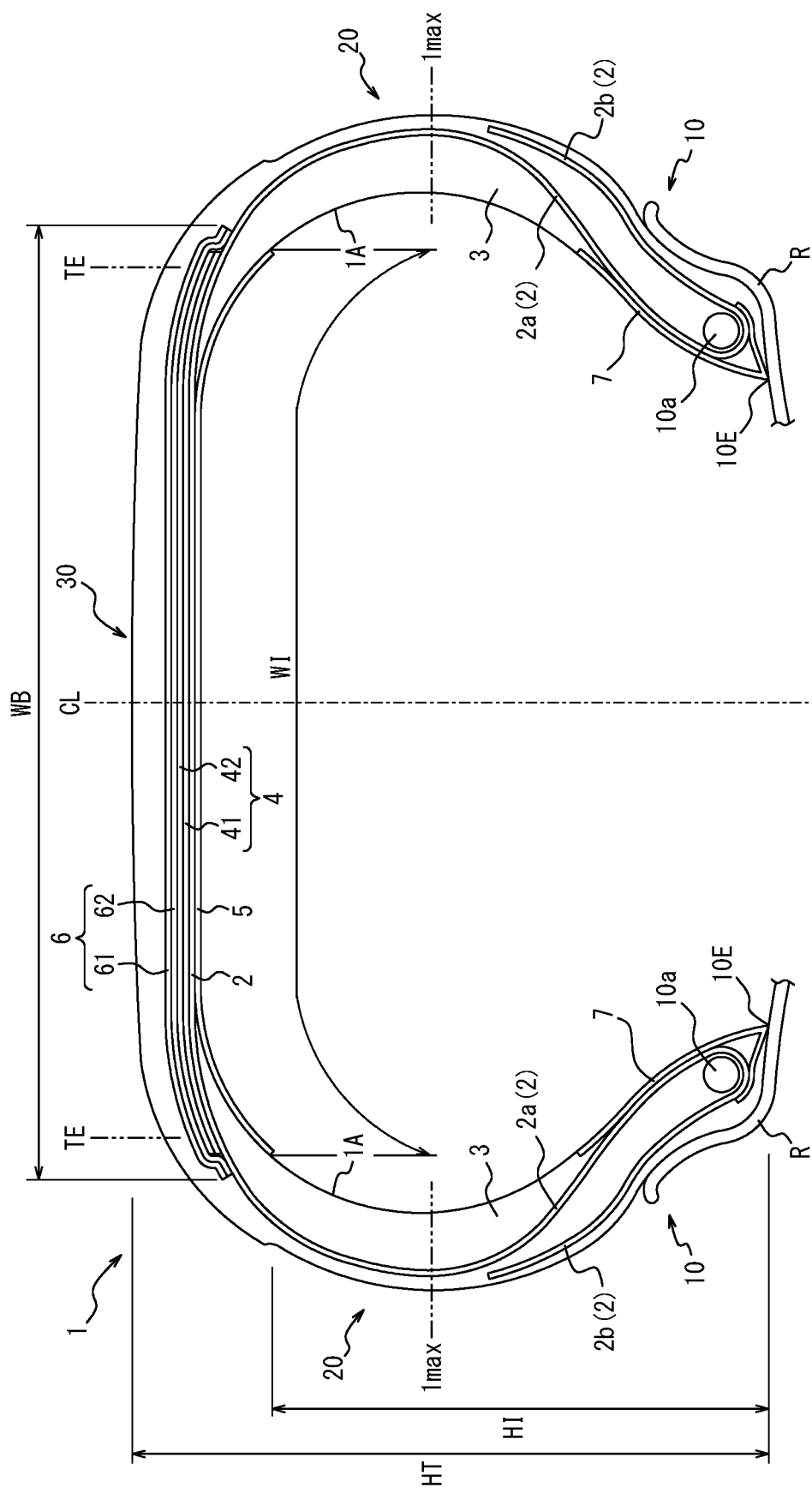
FIG. 1 is a cross-sectional view in the tire width direction of a pneumatic tire according to an embodiment of the present disclosure.

An embodiment of a pneumatic tire according to the present disclosure is described below through examples with reference to the drawings. FIG. 1 is a cross-sectional view in the tire width direction of a pneumatic tire 1 (also simply "tire 1") according to an embodiment of the present disclosure. Here, a tire 10 is illustrated in a state of being mounted on a rim R and filled to predetermined internal pressure with no load.

The tire 1 includes a pair of bead portions 10, a pair of sidewall portions 20 extending outward in the tire radial direction of the bead portions 10, a tread portion 30 extending between the sidewall portions 20, a carcass 2 extending toroidally between the bead portions 10, a reinforcing rubber layer 3 provided in the sidewall portions 20, a tire widthwise cross-section of which has a substantially crescent shape, an inclined belt 4, provided in the tread portion 30, including at least one inclined belt layer (two inclined belt layers 41, 42 in the present embodiment) formed by a plurality of cords extending at an inclination to the tire circumferential direction and covered with rubber, and an inner liner 5 provided on an inner peripheral surface 1A of the tire body in at least the tread portion 30. The two inclined belt layers 41, 42 in this example are formed by a plurality of metal (steel) cords covered with rubber and are disposed so that the cords of the inclined belt layers 41, 42 intersect each other. In the tire of the present disclosure, however, the inclined belt layer may be formed by cords of a metal other than steel, or organic fiber cords, covered with rubber.

This tire 1 also includes a circumferential belt 6, on the outside of the inclined belt 4 in the tire radial direction, including at least one circumferential belt layer (two circumferential belt layers 61, 62 in the present embodiment) formed by cords extending in the tire circumferential direction and covered with rubber. In this example, the two circumferential belt layers 61, 62 are formed by a plurality of organic fiber cords covered with rubber. The circumferential belt 6 is wider than the inclined belt 4 in the tire width direction and is disposed to cover the tire width direction ends of the inclined belt 4. In this example, both the inclined belt 4 and the circumferential belt 6 extend farther outward in the tire width direction than the tread ground contact edges TE.

In this tire 1, the carcass 2 includes a carcass body 2a extending toroidally between bead cores 10a embedded in the bead portions 10 and carcass turn-up portions 2b turned up at the bead cores 10a from the inside towards the outside in the tire width direction. In this example, the carcass turn-up portions 2b terminate farther inward in the tire radial direction than a tire maximum width position 1max of the tire 1.

Furthermore, this tire 1 includes canvas chafers 7 provided on the inner peripheral surface 1A of the tire body at least in the bead portions 10. The canvas chafers 7 extend around the bead cores 10a to cover the carcass 2, forming bead toes 10E. The canvas chafers 7 terminate farther inward in the tire radial direction than the tire maximum width position 1max of the tire 1.

Figure 2:
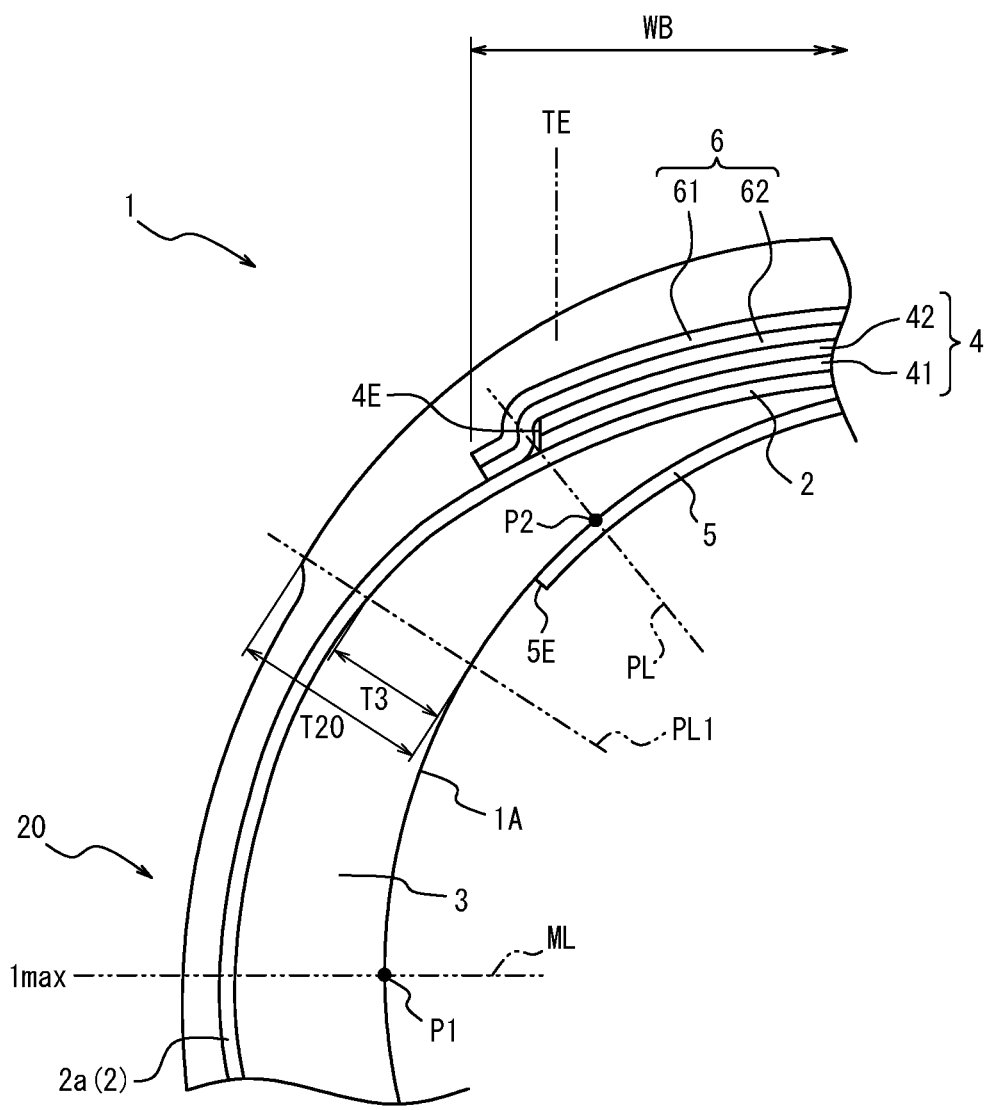
FIG. 2 is a partially enlarged view of a portion of the pneumatic tire in FIG. 1.

FIG. 2 is a partially enlarged view of a portion of the tire 1 in FIG. 1 from near the tire maximum width position 1max to near the tread ground contact edge TE. As illustrated in FIG. 2, an edge 5E of the inner liner 5 in the tire 1 is positioned farther outward in the tire radial direction than the tire maximum width position 1max of the tire 1 and farther inward in the tire radial direction than a perpendicular PL from a tire widthwise edge 4E of the inclined belt 4 to the inner peripheral surface 1A of the tire body.

In greater detail, the edge 5E of the inner liner 5 is positioned on the inner peripheral surface 10A between points P1 and P2. P1 is a point on the inner peripheral surface 1A of the tire body where a tire widthwise line ML at the maximum width position 1max of the tire 1 intersects the inner peripheral surface 10A of the tire body, and P2 is a point on the inner peripheral surface 1A of the tire body where the perpendicular PL from the tire widthwise outer point 4E of the inclined belt 4 to the inner peripheral surface 1A of the tire body intersects the inner peripheral surface 10A of the tire body.

Accordingly, the edge 5E of the inner liner 5 in this tire 1 is positioned on the reinforcing rubber layer 3 provided in the sidewall portion. In this tire 1, a portion of the reinforcing rubber layer 3 outward in the tire radial direction is covered by the inner liner 5, but the majority of the reinforcing rubber layer 3 (in the present embodiment, 60% or more of the outline of the reinforcing rubber layer 3 on the tire inner cavity side) is exposed to the tire inner cavity.

In this tire 1, the inner liner is made of rubber having extremely low air permeability but a large value for tan δ, which is an index of heat buildup, and the provided amount of the inner liner is smaller than in a tire in which the inner liner is provided on the entire inner peripheral surface of the tire body. Therefore, the amount of heat buildup is reduced compared to such a tire, improving the rolling resistance performance of the tire.

In this tire 1, the majority of the reinforcing rubber layer 3, which has a large rubber thickness and a large amount of heat buildup, is exposed to the tire inner cavity. Therefore, the rolling resistance performance of the tire can also be improved in terms of improving the heat dissipation at the reinforcing rubber layer 3.

In general, when the inner liner is provided on the entire inner peripheral surface of the tire body, the inner liner is located between the air with which the tire inner cavity is filled and the tire body, so that only an extremely small amount of air passes from the tire inner cavity into the tire body. On the other hand, when the inner liner is provided partially on the inner peripheral surface of the tire body, a larger amount of air passes from the tire inner cavity into the tire body at the portion where the inner peripheral surface of the tire body is exposed to the tire inner cavity than at the portion where the inner peripheral surface of the tire body is covered by the inner liner. If air passes into the tire body, the rubber forming the tire body is oxidized by the oxygen in the air. Particularly near the tire widthwise edges of the belt member, separation failure may therefore be induced, causing the tire durability to degrade. More so than other portions, separation failure particularly tends to be induced near the tire widthwise edges of the inclined belt, where metal cords are often used.

In the tire 1 of the present embodiment, the edge 5E of the inner liner 5 is positioned farther outward in the tire radial direction than the tire maximum width position 1max of the tire 1 and farther inward in the tire radial direction than the perpendicular PL from the tire widthwise edge 4E of the inclined belt 4 to the inner peripheral surface 1A of the tire body, and the tire widthwise edge 4E of the inclined belt 4 is covered by the inner liner 5 in the perpendicular direction to the inner peripheral surface 1A of the tire body. Therefore, the rubber around the tire widthwise edge 4E of the inclined belt 4 is not easily oxidized. Consequently, the belt and the rubber do not easily separate around the tire widthwise edge 4E of the inclined belt 4. The portion where the inner liner 5 is provided thus reduces the rolling resistance of the tire while suppressing a decrease in the tire durability.

The air with which the tire inner cavity is filled diffuses substantially along the direction of a perpendicular to the inner peripheral surface 1A of the tire body when the tire rolls under a load. Therefore, by restricting the position of the edge 5E of the inner liner 5 with respect to the perpendicular PL from the tire widthwise edge 4E of the inclined belt 4 to the inner peripheral surface 1A of the tire body, the rubber near the tire widthwise edge 4E of the inclined belt 4 is oxidized less easily, thereby suppressing a decrease in tire durability.

In the tire 1 of the present embodiment, the edge 5E of the inner liner 5 in a tire widthwise cross-sectional view is preferably positioned farther outward in the tire radial direction than the height position at 70% of the tire height of the tire 1. In other words, the tire radial height HI of the edge 5E of the inner liner 5 is preferably 70% or more of the tire radial height HT of the tire 1. In this case, the provided area (provided amount) of the inner liner 5 in the overall tire 1 reduces, thereby further reducing the amount of heat buildup of the tire and further improving the rolling resistance performance of the tire.

To further improve the rolling resistance performance of the tire, the edge 5E of the inner liner 5 in a tire widthwise cross-sectional view is more preferably positioned farther outward in the tire radial direction than the height position at 75% of the tire height of the tire 1.

In the tire 1 of the present embodiment, a tire widthwise maximum width WB of the inclined belt 4 and a periphery width WI of the inner liner 5 in a tire widthwise cross-sectional view preferably satisfy Relational Expression (1) below.

$$WB \leq WI \leq WB+20 \text{ mm} \qquad (1)$$

If the periphery width WI of the inner liner 5 is at least the tire widthwise maximum width WB of the inclined belt 4 (WB≤WI), then the tire widthwise edge 4E of the inclined belt 4 is sufficiently covered by the inner liner 5, and oxidation of rubber around the tire widthwise edge 4E of the inclined belt 4 is inhibited. On the other hand, if the periphery width WI of the inner liner 5 is at most a length 20 mm greater than the tire widthwise maximum width WB of the inclined belt 4 (WI≤WB+20), then the provided area (provided amount) of the inner liner is minimized, reducing the amount of heat buildup and improving the rolling resistance performance of the tire. In other words, improvement in the rolling resistance performance of the tire and suppression of a decrease in the tire durability can more reliably be combined by Relational Expression (1) being satisfied.

In a tire widthwise cross-sectional view, the edge 5E of the inner liner 5 is preferably positioned farther outward in the tire radial direction than a perpendicular to the inner peripheral surface 1A of the tire body where, along the perpendicular, the ratio of the gauge thickness T3 of the reinforcing rubber layer 3 to the gauge thickness T20 of the sidewall portion 20 (T3/T20) is 0.65. In other words, when viewing the gauge thickness of the tire 1 in a tire widthwise cross-section from the direction perpendicular to the inner peripheral surface 1A of the tire body, the edge 5E of the inner liner 5 is preferably positioned farther outward in the tire radial direction than a perpendicular PL1 at a position where the gauge thickness T3 of the reinforcing rubber layer 3 is 0.65 times the gauge thickness T20 of the sidewall portion 20.

In this case, the portion where the ratio of the gauge thickness T3 of the reinforcing rubber layer 3 to the gauge thickness T20 of the sidewall portion 20 is relatively small is covered by the inner liner 5, whereas the portion where the ratio of the gauge thickness T3 of the reinforcing rubber layer 3 to the gauge thickness T20 of the sidewall portion 20 is relatively large is exposed to the tire inner cavity. Therefore, the heat dissipation of the tire improves, further improving the rolling resistance performance of the tire.

In the tire 1, the carcass turn-up portion 2b terminates farther inward in the tire radial direction than the tire maximum width position 1max, and the carcass turn-up portion 2b does not overlap the edge 5E of the inner liner 5 in the direction perpendicular to the inner peripheral surface 1A of the tire body. Therefore, the weight of the tire can be reduced.

Furthermore, as described above, the canvas chafer 7 is provided around the bead core 10a of the bead portion 10 in this tire 1, but the canvas chafer may be omitted from the bead portion 10, in which case the weight of the tire can be further reduced.

Examples

Examples of the present disclosure are described below; however, the present disclosure is in no way limited to these Examples.

Example Tires and Comparative Example Tires (all having a tire size of 205/60R16) according to the specifications listed in Table 1 were/are experimentally produced, and the rolling resistance performance of the tires and the tire durability were/are evaluated.

Example Tire 1 was the tire illustrated in FIG. 1 and included, in a tire widthwise cross-sectional view, a pair of bead portions, a pair of sidewall portions extending outward in the tire radial direction of the bead portions, a tread portion extending between the sidewall portions, a carcass extending toroidally between the bead portions, a reinforcing rubber layer provided in the sidewall portions, a tire widthwise cross-section of which has a substantially crescent shape, an inclined belt, provided in the tread portion, including at least one inclined belt layer (two inclined belt layers in the illustrated example) formed by a plurality of cords extending at an inclination to the tire circumferential direction and covered with rubber, and an inner liner provided on the inner peripheral surface of the tire body in at least the tread portion. The inner liner was provided so that an edge of the inner liner was positioned farther outward in the tire radial direction than the tire maximum width position 1max of the tire and farther inward in the tire radial direction than a perpendicular PL from a tire widthwise edge of the inclined belt to the inner peripheral surface of the tire body. The edge of the inner liner was also positioned at a height position at 80% of the tire height HT of the tire 1.

The Comparative Example Tire 1 was the same tire as Example Tire 1, except that in a tire widthwise cross-sectional view, the edge of the inner liner was positioned on the bead toe (in other words, the inner liner was provided on the entire inner peripheral surface of the tire body).

The Comparative Example Tire 2 is the same tire as Example Tire 1, except that in a tire widthwise cross-sectional view, the edge of the inner liner is positioned farther outward in the tire radial direction than the bead toe and farther inward in the tire radial direction than the tire maximum width position.

The Comparative Example Tire 3 is the same tire as Example Tire 1, except that in a tire widthwise cross-sectional view, the edge of the inner liner is positioned farther outward in the tire radial direction than a perpendicular from a tire widthwise edge of the inclined belt to the inner peripheral surface of the tire body.

Example Tires 2 to 6 are the same tire as Example Tire 1, except that in a tire widthwise cross-sectional view, the height position of the edge of the inner liner relative to the tire height (HI/HT) differs.

Example Tire 7 is the same tire as Example Tire 1, except that in a tire widthwise cross-sectional view, the tire widthwise maximum width WB of the inclined belt and the periphery width WI of the inner liner satisfy WB>WI.

Example Tire 8 was the same tire as Example Tire 1, except that in a tire widthwise cross-sectional view, the tire widthwise maximum width WB of the inclined belt and the periphery width WI of the inner liner satisfied WI>WB+20 mm.

Example Tire 9 was the same tire as Example Tire 1, except that the edge of the inner liner was positioned farther inward in the tire radial direction than a perpendicular to the inner peripheral surface of the tire body where, along the perpendicular, the ratio of the gauge thickness of the reinforcing rubber layer to the gauge thickness of the sidewall portion was 0.65.

[Rolling Resistance Performance]

Each sample tire was/is filled to an internal pressure of 210 kPa (equivalent pressure), mounted on a steam drum tester with a smooth surface, and run on the drum (steel drum, diameter of 1.7 m) under the conditions of a load of 4.94 kN, a speed of 80 km/h, and an environmental temperature of 25±2° C. The rolling resistance at this time was/is measured by a method conforming to ISO-28580. The measurement results are listed in Table 1 as index values with Comparative Example Tire 1 as 100. A larger index value indicates better rolling resistance performance.

[Tire Durability]

The tires were/are mounted on a rim, filled to a predetermined internal pressure, and run 300 km in a drum tester while raising the speed 10 km/h at a time from 250 km/h. After the test, the tire was/is disassembled and tested for separation inside the tire from the sidewall portion to the tread portion. The occurrence of separation was/is evaluated as "fail", and no separation was evaluated as "pass".

REFERENCE SIGNS LIST

1 Tire
1A Inner peripheral surface of tire body
1max Tire maximum width position
2 Carcass
2a Carcass body
2b Carcass turn-up portion
3 Reinforcing rubber layer
4 Inclined belt
4E Tire widthwise edge of inclined belt
41, 42 Inclined belt layer
5 Inner liner
5E Edge of inner liner
6 Circumferential belt
61, 62 Circumferential belt layer
7 Canvas chafer
10a Bead core
CL Tire equatorial plane
HI Tire radial height of edge of inner liner
HT Tire height (in tire radial direction)
PL Perpendicular from tire widthwise edge of inclined belt to inner peripheral surface of tire body
TE Tread ground contact edge

The invention claimed is:

1. A pneumatic tire comprising: a pair of bead portions; a pair of bead cores each embedded in the respective bead portion; a pair of sidewall portions extending outward in a tire radial direction of the bead portions; a tread portion extending between the sidewall portions; a carcass extending toroidally between the bead portions; a reinforcing rubber layer provided in the sidewall portions, a tire widthwise cross-section of the reinforcing rubber layer having a substantially crescent shape; an inclined belt, provided in the tread portion, including at least one inclined belt layer

TABLE 1

| | Position of edge of inner liner | Ratio HI/HT | Relationship between tire widthwise width WB of inclined belt and periphery width WI of inner liner | Ratio at position of edge of inner liner (T3/T20) | Rolling resistance performance (INDEX) | Tire durability (INDEX) |
|---|---|---|---|---|---|---|
| Example 1 | Farther outward in tire radial direction than tire maximum width position 1max and farther inward in tire radial direction than perpendicular PL | 80 | WB ≤ WI | 0.65 | 103 | pass |
| Comparative Example 1 | On bead toe | — | | — | 100 | pass |
| Comparative Example 2 | Farther inward in tire radial direction than tire maximum width position | 50 | | 0.65 | 100 | pass |
| Comparative Example 3 | Farther outward in tire radial direction than perpendicular PL | 90 | WB > WI | — | 104 | fail |
| Example 2 | Farther outward in tire radial direction than tire maximum width position 1max and farther inward in tire radial direction than perpendicular PL | 75 | WB ≤ WI | 0.65 | 102.5 | pass |
| Example 3 | | 70 | | 0.65 | 102 | pass |
| Example 4 | | 65 | | 0.65 | 101.5 | pass |
| Example 5 | | 60 | | 0.65 | 101 | pass |
| Example 6 | | 55 | | 0.65 | 100.5 | pass |
| Example 7 | | 80 | WB > WI | 0.65 | 103.5 | fail |
| Example 8 | | 80 | WI > WB + 20 mm | 0.65 | 100.5 | pass |
| Example 9 | | 80 | WB ≤ WI | 0.8 | 100.5 | pass | formed by a plurality of cords extending at an inclination to a tire circumferential direction and covered with rubber; a circumferential belt, provided outside of the inclined belt in the tire radial direction, including at least one circumferential belt layer formed by a plurality of cords extending in the tire circumferential direction and covered with rubber; and only one inner liner provided on an inner peripheral surface of a tire body in the tread portion;

wherein in a tire widthwise cross-sectional view, an edge of the inner liner is positioned farther outward in the tire radial direction than a tire maximum width position of the pneumatic tire, the edge of the inner liner is positioned farther inward in the tire radial direction and farther outward in the tire width direction than a point of the inner peripheral surface of the tire body where a perpendicular from a tire widthwise edge of the inclined belt to the inner peripheral surface of the tire body intersects the inner peripheral surface of the tire body, the edge of the inner liner is positioned farther inward in the tire width direction than an edge of the circumferential belt and farther outward in the tire width direction than the tire widthwise edge of the inclined belt, the reinforcing rubber layer forms an inner surface of the tire in a region inward from an edge of the inner liner in the tire radial direction, and the carcass includes a carcass body extending toroidally between the bead cores and a pair of carcass turn-up portions each turned up at the respective bead core from the inside towards the outside in the tire width direction.

2. The pneumatic tire of claim 1, wherein in the tire widthwise cross-sectional view, the edge of the inner liner is positioned farther outward in the tire radial direction than a height position at 70% of a tire height of the pneumatic tire.

3. The pneumatic tire of claim 2, wherein in the tire widthwise cross-sectional view, a tire widthwise maximum width (WB) of the inclined belt and a periphery width (WI) of the inner liner satisfy relational expression (1), WB≤WI≤WB+20 mm (1).

4. The pneumatic tire of claim 3, wherein in the tire widthwise cross-sectional view, the edge of the inner liner is positioned farther outward in the tire radial direction than a perpendicular to the inner peripheral surface of the tire body where, along the perpendicular, a ratio of a gauge thickness of the reinforcing rubber layer to a gauge thickness of the sidewall portion is 0.65.

5. The pneumatic tire of claim 2, wherein in the tire widthwise cross-sectional view, the edge of the inner liner is positioned farther outward in the tire radial direction than a perpendicular to the inner peripheral surface of the tire body where, along the perpendicular, a ratio of a gauge thickness of the reinforcing rubber layer to a gauge thickness of the sidewall portion is 0.65.

6. The pneumatic tire of claim 1, wherein in the tire widthwise cross-sectional view, a tire widthwise maximum width (WB) of the inclined belt and a periphery width (WI) of the inner liner satisfy relational expression (1), WB≤WI≤WB+20 mm (1).

7. The pneumatic tire of claim 6, wherein in the tire widthwise cross-sectional view, the edge of the inner liner is positioned farther outward in the tire radial direction than a perpendicular to the inner peripheral surface of the tire body where, along the perpendicular, a ratio of a gauge thickness of the reinforcing rubber layer to a gauge thickness of the sidewall portion is 0.65.

8. The pneumatic tire of claim 1, wherein in the tire widthwise cross-sectional view, the edge of the inner liner is positioned farther outward in the tire radial direction than a perpendicular to the inner peripheral surface of the tire body where, along the perpendicular, a ratio of a gauge thickness of the reinforcing rubber layer to a gauge thickness of the sidewall portion is 0.65.

9. The pneumatic tire of claim 1, wherein the edge of the circumferential belt is positioned farther outward in the tire width direction than the tire widthwise edge of the inclined belt.

10. The pneumatic tire of claim 1, wherein the edge of the inner liner is positioned farther outward in the tire width direction than a bead toe.

11. The pneumatic tire of claim 10, wherein the edge of the circumferential belt and the edge of the inclined belt are positioned farther outward in the tire width direction than a tread end.

12. The pneumatic tire of claim 1, wherein the edge of the circumferential belt and the edge of the inclined belt are positioned farther outward in the tire width direction than a tread end.

* * * * *